United States Patent
Binder et al.

(10) Patent No.: US 7,853,912 B2
(45) Date of Patent: Dec. 14, 2010

(54) ARRANGEMENTS FOR DEVELOPING INTEGRATED CIRCUIT DESIGNS

(75) Inventors: William A. Binder, Morrisville, NC (US); Ross B. Leavens, Cary, NC (US); Sherwin C. Murphy, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/934,875

(22) Filed: Nov. 5, 2007

(65) Prior Publication Data

US 2009/0119630 A1    May 7, 2009

(51) Int. Cl.
*G06F 17/50* (2006.01)
*G06F 9/45* (2006.01)

(52) U.S. Cl. .................. 716/6; 716/1; 716/2; 716/4; 716/5; 716/7; 716/10; 716/16

(58) Field of Classification Search .......... 716/4–7, 716/10, 16
See application file for complete search history.

(56) References Cited

U.S. PATENT DOCUMENTS

| | | | |
|---|---|---|---|
| 4,970,664 A * | 11/1990 | Kaiser et al. ............ | 715/804 |
| 5,507,029 A * | 4/1996 | Granato et al. ........... | 716/6 |
| 6,615,395 B1 * | 9/2003 | Hathaway et al. ......... | 716/6 |
| 6,701,505 B1 * | 3/2004 | Srinivasan ............... | 716/10 |
| 7,003,747 B2 * | 2/2006 | Zhou et al. .............. | 716/6 |
| 7,089,143 B2 * | 8/2006 | Foreman et al. .......... | 702/125 |
| 7,143,377 B1 * | 11/2006 | Kudlugi et al. .......... | 716/6 |
| 7,353,477 B2 * | 4/2008 | Hathaway et al. ......... | 716/6 |
| 7,587,698 B1 * | 9/2009 | Rohe et al. .............. | 716/16 |
| 2009/0307645 A1 * | 12/2009 | Buck et al. .............. | 716/6 |

* cited by examiner

*Primary Examiner*—Helen Rossoshek
(74) *Attorney, Agent, or Firm*—Wenjie Li; Schubert Law Group PLLC

(57) ABSTRACT

In some embodiments, a method is disclosed for converging on an acceptable integrated circuit design for an integrated circuit. The method can include selecting a path, determining if the path has a timing deficiency, segmenting the path into path segments and allocating the timing deficiency across the segments according to attributes of the path segments. Segments can have attributes such as a design freeze when the design is mature or "optimum." Allocating can include allocating the timing deficiency across path segments according to attributes such as the proportion of the length of a segmented path to the overall path length. Allocating can include allocating the timing deficiency to path segments based on attributes provided as user input.

17 Claims, 3 Drawing Sheets

ARRANGEMENTS FOR DEVELOPING INTEGRATED CIRCUIT DESIGNS

FIELD

The present disclosure relates generally to circuit design and more particularly to arrangements for analyzing and adjusting circuit timing during a circuit design process.

BACKGROUND

Integrated circuits are at the heart of today's modern computer. Integrated circuits have undergone extensive development for decades. Computer based development tools have greatly assisted in the ability to make these integrated circuits. It can be appreciated that complex integrated circuits are a result of many years of engineering and many years of developing design tools. However, the process of designing new and large integrated circuits is still a large effort and is typically very expensive because of all of the technicalities and details that need to be addressed.

For example, a design must typically consider signal and clock timing issues, manufacturing tolerances, operational changes due to changes in temperature and supply voltage fluctuations to name a few. Thus, the number of design constraints to be considered is expansive and this is why computer assisted design generally plays a big role. One issue that further complicated executing a design is that a complex integrated circuit design is often broken into design tasks of functional blocks such that different specialized design teams can concurrently work on the different tasks. Traditionally, these design groups retreat and work on each portion of the design and not until the design comes back together for "finalization" is timing again analyzed.

During a design process some function blocks may not be able to meet the initial specification and then the input/output specification of the function blocks may need to be altered. It can be seen that before completion of the design there may need to be many iterations in the process to achieve a design that will work properly. If such a design process is not closely and properly managed an integrated circuit design project can quickly go over budget.

Timing of signals in an integrated circuit design can be one of the most challenging design considerations. It can be appreciated in an average microprocessor integrated circuit there can be hundreds of thousands of signals propagating within the integrated circuit at any given time. Such signals must be synchronized such that they arrive at the intended destination at the appropriate time. Often timing is one of the last criteria analyzed by a design tool and if at this latter stage timing specifications are not met the design process might have to be revisited at various levels where many function blocks can require a redesign. It is very inefficient when designers must go back and change designs that have already been allocated space in the design and have been adjusted to pass simulation requirements, etc. It can be appreciated that the cost to design new integrated circuits or improve on old integrated circuit designs can be relatively expensive and current design tools and processes for integrated circuits that revisit timing at the end of the design process are less than perfect.

As stated above, integrated circuit design activities often occur in parallel, and when the design is nearly complete, then timing issues are analyzed. Thus, engineering groups will often think that they are done, and when timing is found to be unacceptable, then they must re-design their portion of the design. This can cause scheduling issues among other things for design teams and project managers. In traditional design practices, the global nature of the percentages of timing issues to be fixed by each function block design team was very pessimistic because different paths often pass through different numbers of function blocks. Macros can be considered as a program that creates and analyzes a functional block of an integrated circuit. Thus, a macro can operate on a file that contains the design for a particular function block of a section of the design. One macro can be worked on separately or independently of other macros, and the interface definitions of the macros allow data from multiple macros to be merged together for the final design product.

In some cases, it was possible that not all unacceptable path delays would be fixed in a second round of timing analysis, thus, requiring additional rounds of analysis and redesign to satisfy timing requirements before a design could be completed. Also, based on these inputs, designers often "overcompensate" or overshoot the new timing specification, where again, timing parameters are not met and an efficient design does not result. One traditional method for analyzing timing and generating timing feedback is to force each path through a macro to fix all of the failing slack seen by its parent, and to not allow a macro to worsen timing for paths that have acceptable timing at the parent level.

In other traditional methods, a designer might force each macro to fix a predefined amount of failing slack seen by its parent, such as one half (50%). However, these predefined parameters would be "global" in nature and the parameters would be applied to the timing feedback given to all interfaces of the function block. This method of correcting timing deficiencies is less than perfect and very limiting because any change made at the parent level of the hierarchy could cause very significant changes to the macro feedback assertions, no matter whether the change improved or degraded timing. These methods also results in overachieving on the correction of timing deficiencies.

Such "overcompensation" can often cause an inefficient circuit operation where devices are larger than required, and these devices could be smaller such that they consume less power. Generally, smaller devices provide for slower propagation of the signal. This implementation can degrade the efficiency of the design because the paths with acceptable slack were generally not analyzed for improved efficiency, once they were acceptable or positive. Accordingly, devices in these paths/circuits could not be reduced in size, making the path more efficient once the designer had acceptable timing.

Another traditional method for addressing timing solutions was to manually specify timing "contracts" between function blocks or macros based on an engineering judgment. These contracts were a manual attempt to divide cycle time of the clock domain between the various function blocks and the interconnect portions of a given path, based on human estimations. This method required a lot of manual intervention by designers and detailed knowledge of the design and layout of the components, or "floor plan", of the integrated circuit. Critical knowledge is often unavailable at the time that the contracts are created and thus guesses or estimations had to be made. In addition, the contracts needed to be revisited and updated every time that a portion of the design was modified to ensure that timing remained acceptable. It can be appreciated that this traditional process was inefficient and error prone.

Another traditional design method includes defining default timing specifications or timing assertions for macros or function blocks. These default values generally included assumptions and generalizations made by experienced designers. An example, would be the general assumption that all macros inputs and outputs are latch bound such that the latches could be utilized to delay a signal when needed. Then, the default assertions could be defined to allow one third of the cycle time for the source macro, one third for the interconnect between macros, and one third for the sink macro. This can also lead to an inefficient design process and an inefficient design. This traditional method is a faster way to create a timing specification than other traditional methods that require time and effort to define timing contracts for all macros. However, it was also very error prone for many reasons.

SUMMARY

In some embodiments, a method is disclosed for converging on acceptable signal timing for an integrated circuit design. The method can include selecting by a computer, a signal path, determining by the computer, if the path has a timing deficiency, segmenting by the computer, the path into path segments and allocating by the computer, the timing deficiency across the segments according to attributes of the segment, wherein the attributes comprise a percentage of path segment length to a total path length. Attributes can include a path segment length, types of devices in the segment, a design freeze for the segment and user input regarding treatment of the segment. Allocating can include allocating the timing deficiency across path segments according to the proportion of the length of a segmented path to the overall path length. Thus, if a path segment is one sixth of the path length one sixth of the timing deficiency can be allocated to the path segment. Segments can be tagged with a design freeze when the design is mature or "optimum" or a manager does not have the resources to "revisit" this portion of the design. Allocating the timing deficiency can include allocating the change in timing to path segments that are not under a design freeze and allocating the timing deficiency across the path segments according to the percentage of the path segment with respect to the total path length.

In some embodiments, a method is disclosed for converging on acceptable signal timing for an integrated circuit design. The method can include selecting, by a computer, a path; determining, by the computer, if the path has a timing deficiency; segmenting, by the computer, the path into path segments; allocating, by the computer, the timing deficiency based on attributes of the segments; and modifying, by the computer, at least one device in a path if a signal arrives early such that the path has a lower power consumption with the at least one modified device.

In one embodiment, a system is disclosed that can better facilitate the design of integrated circuits. The system can include a path selection module to select a path for timing analysis, a total path timing analysis module to determine if timing of the selected path does not meet a predetermined timing criteria, a path segmentor to segment the selected path, and a segmented path retiming module to determine the entire path length, and the proportion each segment contributes to the entire length. Based on these proportions these allocate new timing specifications to the segmented path in response to the determination that the selected path does not meet the predetermined timing criteria, wherein the new timing specifications are based upon a percentage of segmented path length to a total path length. The system can also include a lock down module to lock down at least a portion of the path such that the segmented path retiming module refrains from allocating the new timing specification to a portion of the path. The system can also include an input/output module to accept user input in response to the timing of the segment of the path and a segment assembler to assemble paths that are parsed into function blocks that are processable by separate processing resources.

In one embodiment, a system is disclosed that can better facilitate the design of integrated circuits. The system can include a path selection module to select a path to perform a timing analysis; a path timing analysis module to determine if timing of the selected path does not meet a predetermined timing criteria; a path segmentor to segment the selected path and to determine a segmented path length; a segmented path retiming module to allocate new timing specifications to the segmented path in response to the length of the segmented path and the determination that the selected path does not meet the predetermined timing criteria; and a macro assembler to interrelate connections and timing considerations of macros, wherein the macro assembler returns modified timing data to a macro based on a segment being assigned to the macro.

In yet another embodiment a tangible, machine-accessible, storage medium is disclosed that contains instructions which, when the instructions are executed by a machine, cause the machine to perform operations. The operations can include selecting a signal path, determining if the path has a timing deficiency, segmenting the path into path segments, and allocating the timing deficiency across the segments based on the length of the segmented path, wherein the attributes comprise a percentage of path segment length to a total path length.

BRIEF DESCRIPTION OF THE DRAWINGS

Aspects of the invention will become apparent upon reading the following detailed description and upon reference to the accompanying drawings which, like references, may indicate similar elements.

DETAILED DESCRIPTION

Figure 1:
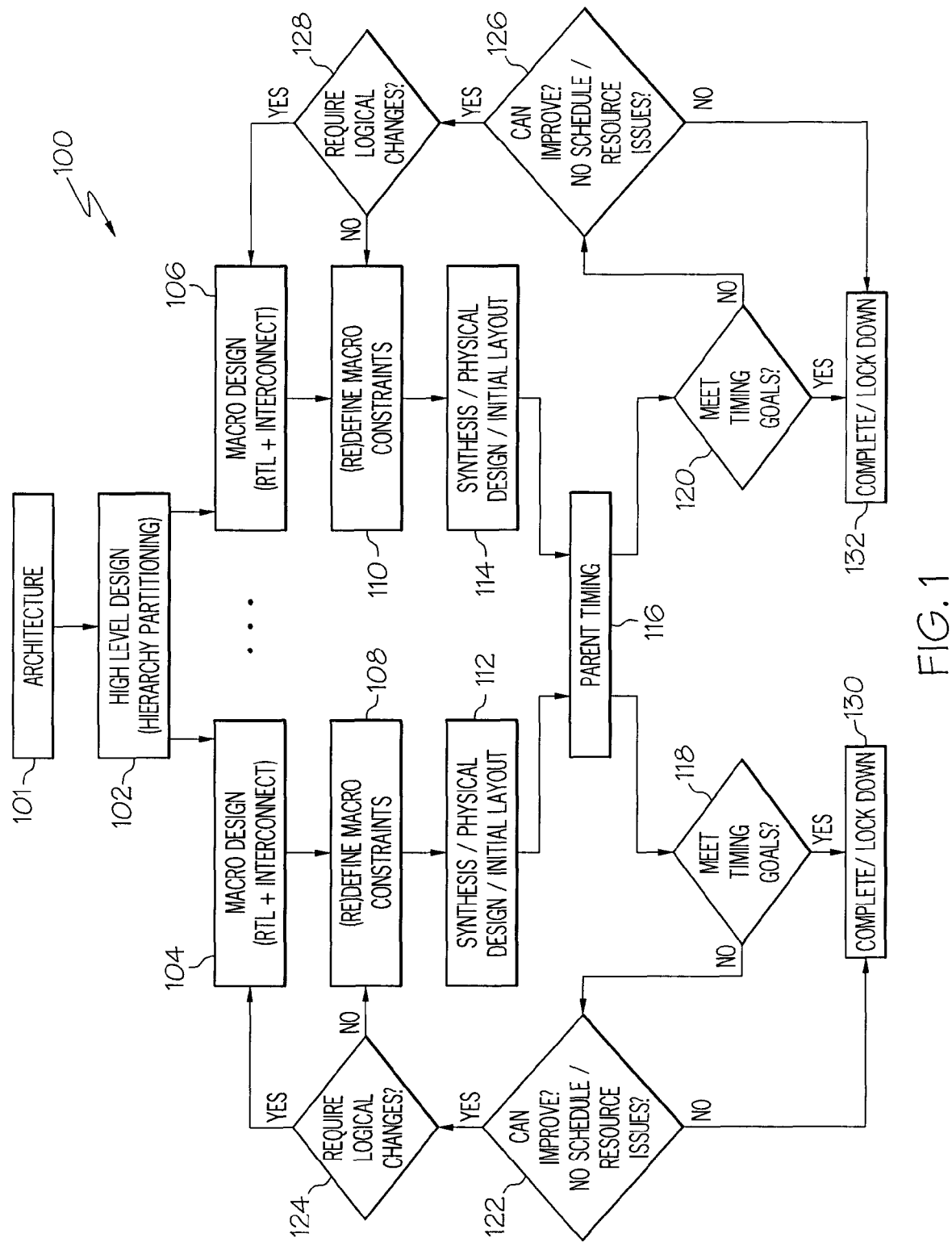
FIG. 1 is a flow diagram of a design process.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Disclosed herein are arrangements for defining and refining timing specifications for signal processing segments of an integrated circuit during a design process. The process can determine timing deficiencies of a path, can segment the path traveled by a signal that has the timing deficiency and can allocate portions of the timing deficiency to segments based on predetermined guidelines and user selectable guidelines. This information can be distributed to designers or design groups such that the timing specification can be continuously updated during the design process. Traditionally, timing coordination was addressed during the end of the design process and when timing issues where found many design groups would have to revisit timing issues and redesign their circuits, which is very costly and an inefficient way to perform design work.

In some embodiments, arrangements are disclosed for quickly converging on an acceptable timing configuration for an integrated circuit design. These arrangements can assist in project management. One arrangement is a method that includes selecting a signal path, determining if the path has a timing deficiency, segmenting the path into path segments and allocating a full path timing deficiency across the segments according to the length of the segment. Segments of the design can be tagged with a design freeze when the design is mature, close to "optimum", or resources are unavailable to revisit the design of the segment. This way timing issues can be narrowed down to selected segments or design groups. Thus, the process of allocating can include only changing the specification for path segments that are not under a design freeze. In some embodiments the timing deficiency can be allocated across the path segments according to the portion of the total path contained within each segment. In some embodiments the timing deficiency can be allocated based on the complexity of segments and in other embodiments a user can configure which segments get an allocation.

In a design process for larger integrated circuits, it is desirable to separate the design into pieces commonly referred to herein as function blocks. As with many processes, separating the project into smaller more manageable pieces can make the large task more manageable. The function blocks can also be viewed as separate levels of a "physical hierarchy." Separating the design into functional blocks allows the design effort including layout, integration, and timing analysis to be spread out among multiple engineers and designers or multiple design groups. It can be appreciated that some engineers or design groups can specialize in specific types of design work, and separating a design into function blocks allows specific functional blocks to be assigned to a specialty design group. However, there must be at least some communication between the groups as the design evolves.

As part of the initial design or conceptual design, input and output timing parameters can be assigned to the signals entering and exiting the function blocks. Such timing parameters that are assigned to each function block can define what timing conditions/parameters need to be met at the boundaries/pins/interface/interconnection of each function block. Many design processes have an initial design goal regarding timing parameters, and as the design progresses various data can show that the initial timing goals/parameters cannot be met. Thus as a design of a function block evolves, meeting parts of the initial specification may be impossible or economically unfeasible. When this occurs, timing parameters for the function blocks on the failing paths can be refined or readjusted using timing data from the parent level of hierarchy (with all blocks connected together). Thus, at some point the macros must be connected to analyze timing issues. Such an adjustment can force the designer of the function block to "close" timing at the function block boundaries based upon the current conditions of its immediate parent (upstream function block).

It can be appreciated that after a first attempt is made to design all of the function blocks and the blocks are connected together, a computer can analyze the propagation of signals and tell a design group what signals lag or are too slow in reaching a specific area and what signals reach their destination too quickly (herein referred to collectively as timing deficiencies) but commonly referred to as slack). In accordance with some embodiments disclosed herein, after small advances in design effort, the disclosed system can generate a revised set of timing feedback assertions/parameters/guidelines that can quickly and efficiently define timing requirements for each functional block in the hierarchical design.

The system can perform this timing loop often to provide improved communications between design groups. This ability to arrive at an acceptable timing design can be referred to as "closing" the timing on the design.

Referring to FIG. 1, a method for designing an integrated circuit is disclosed. After a high level architecture is created as illustrated by block 101, the high level architecture or design can be partitioned as illustrated by block 102. After the partitioning the design can be divided into multiple macros or macro designs. The multiple paths are represented by the two arrows that exit block 102. Thus, below block 102 are substantially identical yet separate or independent design processes that can cycle in a loop and can share information at block 116 where timing is analyzed at the parent level. This is represented by the dots below block 102 and although only two macros or design loops are illustrated many different macros could loop through block 116 where the designs provide information and top level timing is analyzed.

As illustrated by blocks 104 and 106, the macros can process a register transfer level (RTL) description, also called register transfer logic. RTL can be a description of data flow between registers, which store information between clock cycles in a digital circuit. RTL descriptions can specify what and where this information is stored and how it is passed through the circuit during its operation. Such descriptions can also define timing of the circuit as such data is passed between registers. The macros can also define the interconnection between other macros and between the macro and registers.

Engineering groups can work on portions of the design such as function blocks of the design using the macros. The macros can have defined inputs and outputs and timing specifications for the inputs and outputs. The system can define (or redefine) the macro constraints as illustrated in blocks 108 and 110. Synthesis, physical design, and initial layout can be performed on the macros as illustrated by blocks 112 and 114. Data on all macros can be collected and analyzed and a check of the parent timing can be made on the "entire" design or critical portion of the design, as illustrated by block 116.

As illustrated by decision blocks 118 and 120, it can be determined if the timing goals are met by the individual function block/macro. If the timing goals are met, a timing lock down or design freeze can be made on a portion or segment of the design as illustrated by blocks 130 and 132. The process can end thereafter. If at decision blocks 118 and 120 the timing goals are not met, then as illustrated by decision blocks 122 and 126, it can be determined if the timing can be improved and there is no scheduling and no resource issue. If timing cannot be improved or there are scheduling or resource issues, then the macros can be locked down as illustrated by blocks 130 and 132.

This can be done by a user interface that interacts with a user, where the user can dictate what is locked or what remains unlocked. If at decision blocks 122 and 126, the timing can be improved and resources are available, then the design can be evaluated to determine if logical changes are required as illustrated by decision blocks 124 and 128. When logical changes are required, then one or all of the macro designs, the RTLs, and/or the interconnect can be reworked, as illustrated by blocks 104 and 106, and the process can iterate. When logical changes are not required at decision block 124 and 128, then the macro timing constraints can be revisited.

As stated above, the functional blocks of the design can be periodically brought back together for timing analysis as illustrated by block 116. The smaller design loop that includes blocks 108, 112, 116, 118, 122, and 124 (108-124) provides a quick communicative loop that greatly enhances the efficiency of the design process. In traditional design processes the "feedback" process illustrated by blocks 108-124 could not be started until later in the design process when each group had a "mature" design. It can be appreciated that the loop illustrated by locks 108-124 allows a design to close much faster. It can also be appreciated that the loop illustrated by blocks 108-124 can be started much earlier in the process.

Also, the disclosed method will typically require less loop iterations (i.e. the loop illustrated by blocks 108-124) to achieve a final acceptable design. This is because the timing feedback algorithm disclosed can analyze paths and then allocate the timing deficiencies based on multiple criteria. Such a looped process provides a loop which stabilizes faster. Allowing a design freeze on macros, paths, etc. also allows for less loop iterations.

In traditional designs, macros were not completed or frozen until the end of the project, and thus, there were no portions of the design that could be considered complete such that resources could be reallocated. Accordingly, finished designs that were optimal were often redesigned. Freezing or locking down macros before the "end" of the project can "guarantee" that nobody involved in the design process can request timing changes to the macro near the end of the design while other macros and macro portions are still undergoing changes.

Figure 2:
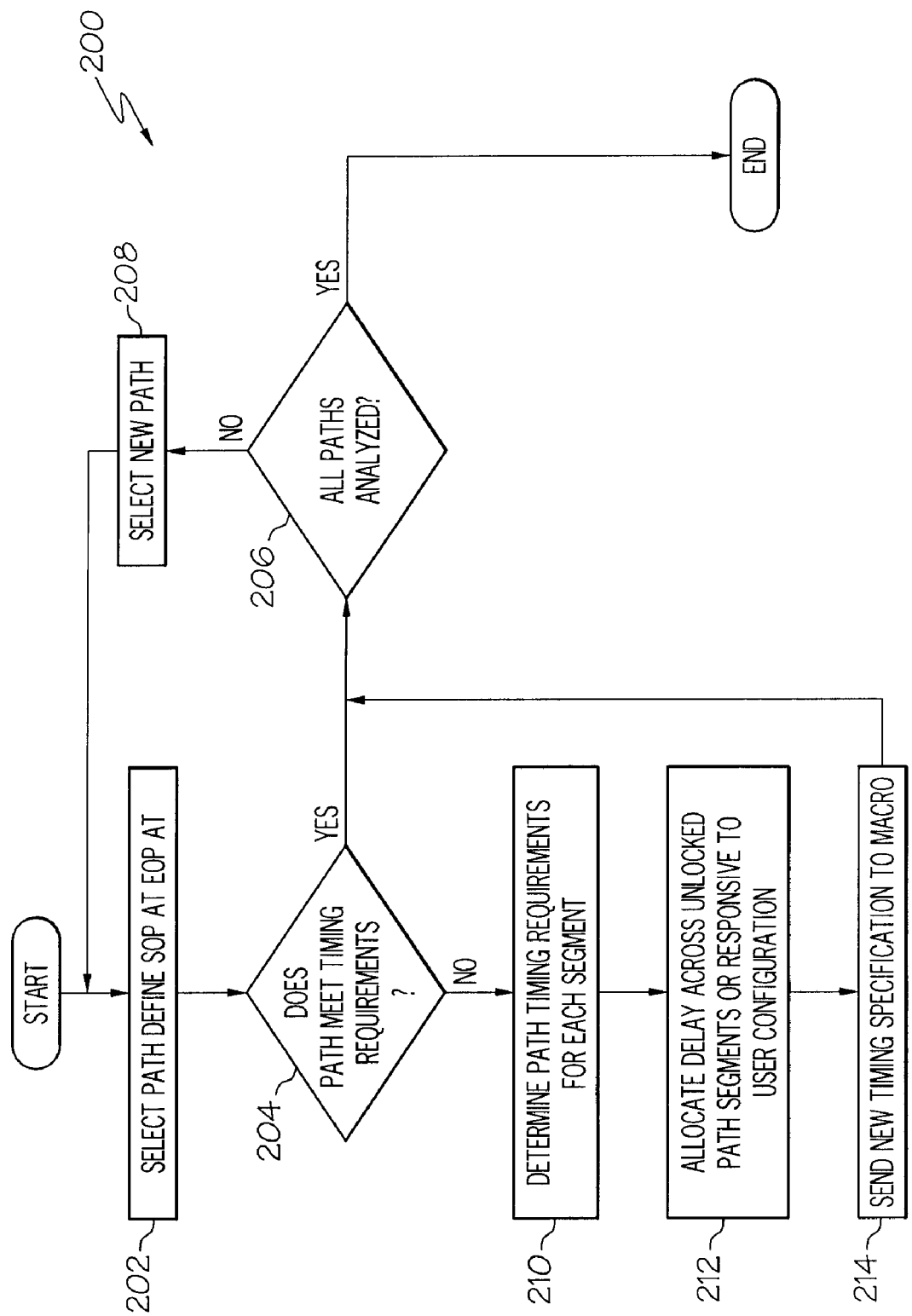
FIG. 2 is a flow diagram of a method for addressing timing consideration in an integrated circuit design process.

Referring to FIG. 2, a flow diagram for a method for analyzing timing is disclosed. As illustrated by block 202, a signal path can be selected for analysis. The start of the path arrival time, (SOP AT) the end of the path arrival time (EOP AT), and the arrival time at each function block or macro can be calculated. As illustrated by block 204, it can be determined if the path meets timing requirements. If the path meets all of the timing requirements, then it can be determined if all paths have been analyzed as illustrated by block 206. If all paths have been analyzed, then the process can end. If paths remain to be analyzed, a new path can be selected as illustrated by block 208 and the process can revert back to block 202.

If at block 240, a path does not make the timing requirements, then as illustrated by block 210, timing for each path segment can be determined. As illustrated by block 212, the total path timing deficiency can be allocated across unlocked path segments based on the percentage of the total path length that is provided by the segment. In some embodiments, user input can be utilized to allocate the timing deficiencies across path segments.

In some embodiments, allocating the timing deficiency can be done across the segments according to attributes of the segment. Attributes can include a path segment length, types of devices in the segment, a design freeze for the segment and user input regarding treatment of the segment. New timing specifications can be assigned to each segment and can be sent to the macro that the segment is associated with as illustrated by block 214. Then, as illustrated by block 206, it can be determined if all paths have been analyzed.

In some embodiments the process can generate a "timing endpoint" report. The report can be generated from a static timing analysis tool. The report can list all pins or connections for each function block or macro and can list the critical or failing paths in the system. Critical paths can include pins of macro or function blocks for which timing feedback assertions or timing issues need to be addressed. For each path needing improvement, the amount of slack and the total path delay can be determined. The total path delay can be calculated from the arrival time at the end of the path and the arrival time at the start of the path, along with any timing adjusts (such as cycle adjusts or clock limit adjusts) that are performed along the way.

As specified by block 214, at any point along the path, an updated arrival time can be calculated by multiplying the path slack by the fractional delay occurring up to the specified location, divided by the total path delay, (i.e. Updated Arrival Time=(Current Arrival Time)+(Path Timing Deficiency)× (Path Delay from Start of Path to Arrival Time Location)/ (Total Path Delay)). For example, assume that the Current Arrival Time=50 ns, the Path Timing Deficiency=−50 (i.e. path is 50 time units too slow), the Total Path Delay=200 ns, and the Path Delay from Start of Path to Arrival Time Location=50 ns. In this example, the Start of Path to Arrival Time Delay and the Current Arrival Time are the same. The above calculations may depict a typical timing deficiency scenario, but does provides a simplify explanation.

Using the equation Updated Arrival Time=(Current Arrival Time)+((Path Timing Deficiency)×(Path Delay from Start of Path to Arrival Time Location)/(Total Path Delay)), Updated Arrival Time=(50)+((−50)×(50)/(200))

Updated Arrival Time=(50)+((−50)×(0.25))

Updated Arrival Time=(50)+(−12.5)

Updated Arrival Time=37.5 ns

This Updated Arrival Time can be fed back as a new timing specification requirement to be met in the next cycle through the design loop. So in the next iteration, the specification can specify that the signal should or "must" arrive at this location along the path 12.5 time units faster than it currently does. If the Path Timing Deficiency was a positive number (i.e. the path was too fast), then the sign of the Updated Arrival Time would have an opposite sign and the Updated Arrival Time could become larger than the Current Arrival Time, allowing extra margin for scaling down devices or powering down devices in that path, resulting in a more efficient design.

In one embodiment, the method can allocate the correction of timing deficiencies (slack) across each function block or macro according to the portion of the total path contained within each function block or macro. Thus, delay can be added to or removed from the current signal arrival time. This proposed or "newly required" arrival time for the signal can reflect the amount of slack that has been apportioned to the upstream path of the location under analysis. Additionally, this can leave the remaining slack to be fixed by the downstream function block or by the remainder of the path.

As stated above, a slack apportionment methodology that automatically apportions critical slack for a path across all portions of the path is disclosed. Accordingly, the slack can be apportioned based upon the function block's or the path segment's percentage of the calculated overall path delay. The apportionment of negative slack can request each macro (function block) to fix only "its own" portion of a failing slack, and when each macro meets this timing requirement it can be concluded that all levels of hierarchy accomplish the common goal of providing a design that meets timing requirements. The apportionment of positive slack to function blocks that provide a signal to an output faster than required by the design allows a macro or function block to selectively replace faster inefficient devices with slower more efficient devices, or "power down" gates, without moving the timing "too much" and thereby over correcting.

In one embodiment, the system can address many "corner" cases commonly seen in static timing analysis. A "corner case" can be defined as a path or configuration that falls outside of the standard algorithm, use, or expectations or a design. In the case of static timing analysis, an endpoint report path can be generalized as a path that begins at a storage element, optionally passes through any number of combinatorial logic gates, and ends at another storage element. Furthermore, the assumption can be that there is an allowance of one clock cycle for the amount of time that the path has to get from the first to the second storage element. The vast majority of all endpoint report paths fall into the above category, so this can be considered as a generic case.

However, it is possible to have paths where propagation of the signal is allowed to take more than a single cycle to get from the first to the second latch. It is also possible to have transparent storage elements, which can act both like a traditional storage element and like a combinatorial logic gate at the same time. These are both examples of "corner cases" in static timing endpoint reports, because when timing on these paths are determined, they will not provide the same data as that provided for a standard path or configuration, although they can still "look" very similar. Thus, corner cases can be analyzed using static timing analysis but are not "the norm" and require some specialized treatment.

For example, a transparent latch can allow a data signal to pass through (from an input pin to an output pin) when the clock is active, but can retain the value last seen at the input pin when the clock is inactive. Static timing analysis will analyze time from the input pin to the output pin on such a device and assume/allow the signal to continue propagation to the next storage element. However, it is possible for the data to arrive at the input pin later than when the clock becomes inactive, yielding additional unrealistic pessimism regarding the timing at the next storage element downstream. This can be undesirable, so static timing analysis can perform a timing adjust at the transparent latch output pin to "back up" the signal arrival time to the time when the clock became inactive. It is also possible for static timing analysis to "back up" the signal arrival time at the output of a transparent latch by an entire clock cycle. This can be done to perform static timing analysis within a single clock cycle on a long path passing through multiple transparent latches that may take multiple clock cycles to pass through in actuality. Traditional algorithms tend to the generic or standard cases. The disclosed arrangements can properly address these non-standard cases that may include (multi-cycle paths, transparent latches, timing adjusts, etc) because of how the timing is analyzed and how deficiencies are allocated.

As alluded to above, multi-cycle paths, timing adjusts, and clock domain crossings can all be handled "automatically" as the disclosed process iterates. Clock limit timing adjusts can be addressed as a special case. These adjusts can occur by adding transparent latches in a path. The data can arrive at the transparent latch later than the clock turns off and the latch can stop flushing the data directly through to its output. It is desirable to adjust the arrival time at the output of the transparent latch back to when the clock was turned off, representing the absolute worst possible arrival time to the downstream logic that still provides acceptable timing, rather than over penalizing the downstream logic with the even later data arrival time propagation. Many static timing tools perform this type of adjust automatically when this case is encountered.

For failing slacks, the overall critical slack at the endpoint of the path can still be apportioned over the entire path, but the clock limit adjust value must be fixed only by the portion of the path that ends at the transparent latch. For positive slacks at path endpoints, the slack can be apportioned over the entire path, unless this apportionment will allow for the data at a transparent latch in the middle of the path to arrive later than when the clock turns off the latch. In this special case, the slack apportionment can be revisited and readjusted so that less slack is apportioned in front of the transparent latch and the additional slack is apportioned downstream from the transparent latch. For these reasons, when a transparent latch is identified in an endpoint path report, the system can divide the path up into two separate paths (sub-paths) and analyze each path separately. The slacks for each sub-path can be adjusted automatically to account for the effects identified above and to guarantee that the feedback assertions work properly with transparent latches. The disclosed method allows for an unlimited number of transparent latches to be present in a single path.

As stated above, the method allows for locking entire macros, all parent level interconnects, or even portions of macros, interconnects, paths and sub-paths. This can be important when a design approaches release. In these cases, some portions of a design may already be complete and it is desirable to leave these portions locked, even though failing timing paths may still pass through them. As long as these paths pass through portions of the design that are still being worked on, and can close the failing paths on their own, this allows for resource constraints and reduced turnaround time. The portions of the design to be "lock out" of the slack allocation/apportionment can be specified with user input.

The portions of a path that are locked and the delays associated with them can be identified and stored during the first pass through each path utilizing the endpoint report. On the second pass through the path, the stored locked delays can be utilized to adjust the slack apportionment equations to guarantee that no slack is apportioned to the locked portions and all of the slack is apportioned to the unlocked portions of the design. For locked macros that contain combinatorial paths from an input to an output, it is possible that the feedback assertion values will change as the design on either side of the macro changes. However, the process utilized by the method can work towards ensuring that the allowed delay from the input pin to the output pin will remain the same. For locked interconnect delays, a mechanism is allowed via user input to force some portion of the slack to be apportioned to them even though they are locked. This will occur when the interconnect delay portion of the overall path delay surpasses a threshold that is also specified via user input.

Once all paths from the endpoint report have been processed, the feedback assertion files can be determined and stored. The method can loop through each pin of each macro that was stored as a part of the netlist processing. The user input can define "regular expression matches" that can identify clock pins for each clock domain. The user input can also provide assertions for each clock or each clock bus. Macro input pins that match against one or more of these expressions can be written to the feedback assertions using the details available from the user input. Any macro input or output pins that do not have feedback assertion values stored in memory (and therefore were not seen while processing the endpoint report) are considered to be pins without any current timing data.

The user input can specify regular expression matches to indicate what to do with these types of pins. The regular expression matches allow for specifying one way of handling one set of pins with no timing information, and another way of handling a second set of pins that may contain incorrect timing information. There are separate forms of user input that can allow independent specification of input pin arrival times and slews, input pin capacitance, output pin required arrival times, and output pin capacitance and fanout. It is possible for a pin to match multiple regular expression entries. The most specific matching entry is used to generate the default feedback assertion.

Figure 3:
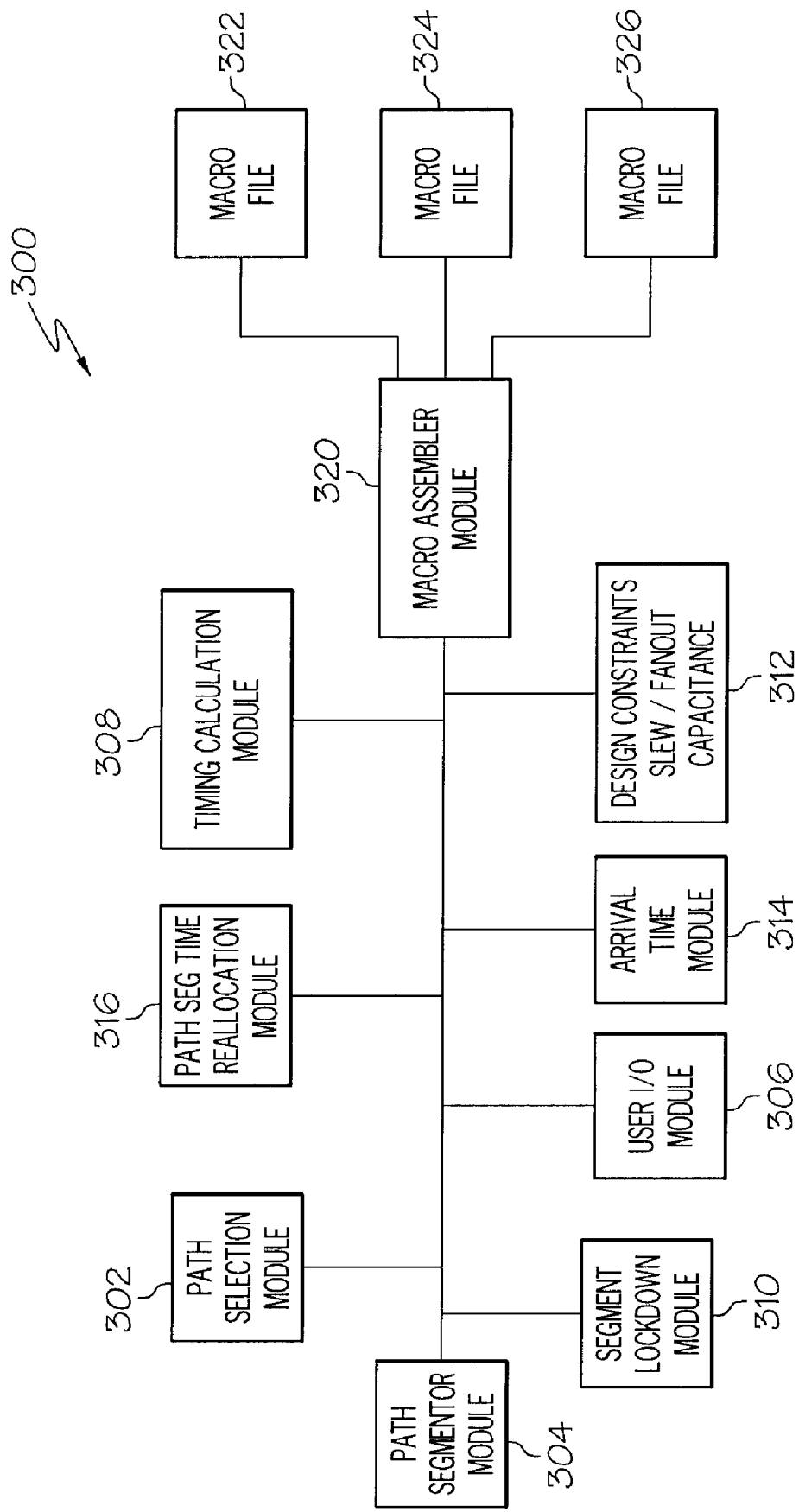
FIG. 3 is a high level block diagram of circuit design system.

Referring to FIG. 3, a system for facilitating a timing specification for an integrated circuit design is disclosed. The system 300 can include a path selection module 302, path segmentor module 304, a user input/output (I/O) module 306, an arrival time module 314, a segmented path time reallocation module 316, a segment freeze/lockdown module 310, a timing calculation module, a macro/path segment assembler module 320, and macro file input modules 322, 324 and 326.

In operation, different macros from different design groups can be entered into the system as files. The files can be related to each other via pins or interconnect information by the macro/path segment assembler 320. The path selection module 302 can select a path for timing analysis. The timing calculation module 308 can calculate timing of a path and determine if the path has timing deficiencies at any location. The timing calculation module 308 can utilize data from the design constraints module 312. Design constraints can include slew, fanout and parasitic capacitance to name a few. The timing calculation module 308 can perform a timing analysis on a total path from start to finish to determine if timing of the selected path meets a predetermined timing criterion.

The path segmentor module 304 can segment the selected path based on the macros and their interconnect definition. The segmented path retiming module 316 can allocate new timing specifications to each segmented path when there is a determination by the timing calculation module 308 that the selected path does not meet the predetermined timing criteria. In some embodiments, the path segmentor retiming module 316 can determine the entire path length, and the proportion each segment contributes to the entire length. Using this, the path segmentor retiming module 316 can allocate timing deficiencies to each path segment according to the percentage or proportion of length of the path segment contributes to the total path length.

The segment lockdown module 310 can lock down at least a portion of the path, such that the segmented path retiming module 316 will not modify the timing specification for a portion of a path that is locked out or has a "design freeze." In some embodiments, the segment path timing re-allocation module 316 can apportion the timing deficiencies or slack for a specific path across all portions (all function blocks) along the path. The apportionment of the total slack across each functional block can be based upon the percentage of the total path delay contained within the functional block or "macro." The slack can also be apportioned back to the parent hierarchy for interconnect delays that occur between function blocks. However, the apportionment of slack can be allocated in one of many ways such as manually via input from the User I/O module 306. The apportionments can be sent back to the appropriate macro files 322-326.

Allowing the macros 322-326 to communicate regularly, allows designers to continually analyze timing on an entire design even though many different groups are working on many different pieces of the design. Thus, timing issues can be evaluated periodically during the "middle" of the design process and based on such an analysis, each design group can receive updated timing requirements. Such a process can provide a give and take between portions of the design and can also freeze portions of the design such that design parameters for the frozen portions of the design will not be allowed to be modified.

As stated above, divided design tasks also allow each macro/functional block to be worked on in parallel as long as the input/output of the functional block has an acceptable design specification such that the design group understands their design goals and other requirements. Input and output specifications can be defined for each function block such that when the design on each function block is complete and meets the specification, connecting the blocks will provide a system that will function as a whole. Concurrent effort on multiple function blocks can greatly reduce design time, particularly when portions of a design can be subcontracted out to others.

In another embodiment, the segment reallocation module 316 can retime a system with both positive and negative timing deficiencies or slack (i.e. lead and lag). The disclosed system can correct positive slacks in a manner that can significantly reduce power consumption. Since the slack can be apportioned automatically on a path by path basis, timing at all levels of the hierarchy can be integrated to achieve a common goal. Such a timing review and adjustment at intermediate design stages was not possible with traditional design methods.

The apportionments of timing deficiencies can solve interconnect delays at the parent level of the hierarchy. The system can make timing corrections by allowing gates and wires to be "powered down" based upon the interconnect delay portion of the overall path delay. These timing corrections could not be achieved under traditional timing correction processes.

It can be appreciated that the disclosed arrangements can analyze multicycle paths, clock domain crossings, and even transparent latches. A transparent latch can be defined as a gated set-reset latch. A transparent latch can accept a data input and an enable signal (sometimes named a clock signal and a control signal). The word transparent is derived from operation of the latch where when the enable input is on, the signal can propagate directly through the circuit, from the input to the output.

Timing issues that are apportioned around transparent latches can provide a high likelihood that that the data or signal will not arrive any later than when the clock turns an output latch or buffer off. Furthermore, both positive and negative slacks at the outputs of transparent latches can be accommodated and corrected, regardless of what the slack is at the input of the latch. This level of detail and accuracy in the handling of transparent latches was generally not possible under previous methods.

The disclosed arrangements also allow for locking the timing parameters for specific function blocks or macros, parent interconnects, or even individual pins or user selected paths or interconnects. Locking a specific portion of the design can accommodate a design process where some portions of the design will meet the timing parameters faster than other parts of the design. Once a portion of a design or function block has made all of the changes that it "possibly can make" to improve or affect the timing of a particular path or paths, then that portion can be "locked" and these portions can be taken out of consideration for re-apportionment. Locking of a portion of a path can force other portions of the path that can still improve timing to make the remainder of the required changes.

Locking portions of the design can be helpful when making minor changes to a design process that is in the final design stages or has begun the fabrication process. When the design process is in the final stages, it is desirable to limit changes to a small portion of a design and leave the remainder of the design unaltered. Locking portions of the design can reduce the complexity of the process, decrease the turnaround time, and increase the reliability of the changes being made. Selectively locking portions of a design and making these portions exempt from timing deficiency allocations was not available with traditional design processes/systems.

The disclosed arrangements allows for the handling of pins that do not contain any timing data. The disclosed arrangements can handle pins or entire macro instantiations that currently contain incorrect timing data (such as an incorrect clock domain), through the use of specified default and override timing values. In other embodiments the disclosed arrangements can handle incorrect timing data through the selective inclusion/exclusion of particular macro instantiations from the feedback timing parameters or "assertion" calculations. In the event of bad parent interconnect timing results, the system allows for the specification of both minimum and maximum capacitance values and minimum and maximum slew values (on a per clock domain basis) to be specified for the feedback assertions. Traditional systems required one or more post processing steps to accomplish these same objectives.

In some embodiments, only the critical slack is used to calculate the feedback assertions or assertion values for each function block I/O or macro pin. In the event where multiple macro instances result in different slacks for the same pin, the system can provide that the worst case timing for each pin is acceptable. All other paths through the function blocks or pins can be "guaranteed" to result in the best timing results possible without causing a critical path to fail. Similarly, the worst slew values can be retained for all input pins, the worst fanout values can be retained for all output pins, and the worst total capacitance values can be retained for all pins. This data can be utilized to ensure that the proper drive strengths are utilized to work with the worst macro instantiations from a capacitive loading perspective in addition to the critical slack. This can be important because the critical path may not be the path with the worst loading characteristics. Arrival time and slew feedback assertions can be calculated and stored for both rising and falling edge of each clock domain that arrives at the pin. Capacitance feedback assertions can be calculated and stored on a per pin basis.

In addition to the timing endpoint report, a configuration file can provide user input to configure and drive the feedback assertion process. The configuration file can specify clock pins, what clock domains they belong to, the location of the endpoint report and netlist or connection data, where to place the feedback assertions, and what macros and macro instances should receive feedback. The configuration file may also specify absolute minimum and maximum assertion values, what to do with macro pins that do not contain any timing information, what to do with macro pins that contain invalid timing information, additional desired slack margin, and what macros, pins, and interconnects are to be locked and not considered for slack apportionment.

The netlist data can provide a complete pin list for macros that need timing improvement/adjustment/assertions. This pin list can be used to identify clock pins and pins that do not contain any timing information. Generally, when a pin does not have any timing information, it can be assumed that the pin was left out of the endpoint report. Another use of the netlist is to obtain a list of internal instances connected to each pin for hierarchical macros. These instances can be used to identify the pin used in a given path if the hierarchical pins are not included in the endpoint report details.

Once the netlist data has been processed and loaded into memory, the endpoint report can be generated. In some embodiments, each path can be processed twice. The first pass through the path can be used to determine path slack, to calculate and determine the total path delay, and to determine the locations of timing adjusts (such as cycle adjusts for multicycle paths or clock limit adjusts for transparent latches). On the second pass through the path, hierarchical crossings that pass into or out of a macro can be utilized to generate feedback assertions for these hierarchical crossings. Each time such a crossing is found, the slack is apportioned to the arrival time at the pin and a new arrival time can be calculated for the clock domain and edge reported in the path. The newly calculated arrival time can be determined as the new feedback assertion value for this macro, pin, edge, and clock domain. This can be determined as long as a more critical slack has not already been determined for the same combination of adjustments. The slew value for input pins, the fanout for output pins, and the total capacitance for all pins can also be determined, as long as more pessimistic values have not already been encountered. Any minimum or maximum timing assertion specified via the configuration file can be applied to the path before storing the new feedback assertion values in memory.

It is also possible that a pin could currently contain timing information that is invalid, such as an input pin that is being driven by the incorrect clock domain. Once these cases are identified, it may be desirable to override the current invalid feedback assertions with default assertions under the correct conditions. This allows for more accurate timing closure work to be performed within the macro than using the invalid conditions, until the top level design can be changed to reflect the correct conditions. The configuration file allows for the specification of regular expression matches to indicate what pins to override and how to override them.

These regular expression matches work in exactly the same fashion as the default matches that handle pins with no timing information, except that these matches will cause the values specified in the configuration file to be used in place of the feedback assertion values stored in memory for the given pin. Once the parent netlist has been changed to reflect the correct timing conditions, these overrides could be removed from the configuration file, allowing for the slack apportionment results stored in memory to be used for the feedback assertions once again.

The disclosed arrangements can reduce design times by improving communication between groups. The disclosed arrangements can save large amounts of time because the various levels of hierarchy contained within the design work together towards a common goal of closing timing or providing acceptable timing. If every level of hierarchy were to successfully close timing with the feedback assertions generated via this method, timing for the entire design could be closed with a single round of feedback. In reality, work progresses at different speeds for different portions of the design, and some portions may not be able to successfully close timing with the current feedback assertions, requiring additional spins of feedback assertions. However, each time design updates are fed back up to the top level and a new round of slack apportioned feedback assertions are generated, the assertions get more accurate and converge towards a final solution that yields timing closure. In addition, the headaches of manually maintaining and updating assertions and verifying that updates still work with other portions of the design are removed. This minimizes the work for the timing analysis engineer, providing much more time to concentrate on the task of actually closing timing on the design.

Generally, systems and methods are disclosed that can reduce the design time for an integrated circuit. An implementation of the process described above, may be stored on, or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Reference to particular configurations of hardware and/or software, those of skill in the art will realize that embodiments may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising:
   selecting, by a computer, a path;
   determining, by the computer, if the path has a timing deficiency;
   segmenting, by the computer, the path into path segments; and
   allocating, by the computer, the timing deficiency based on attributes of the segments, wherein the attributes comprise a percentage of path segment length to a total path length.

2. The method of claim 1, wherein the attribute comprises an unlocked path segment.

3. The method of claim 1, wherein the attribute comprises at least one device in the path segment.

4. The method of claim 1, wherein the attribute comprises a user provided attribute.

5. The method of claim 1, wherein segmenting comprises segmenting the path according to a partitioning of a design.

6. The method of claim 1, further comprising assembling macros to analyze a signal path.

7. The method of claim 1, further comprising performing logical changes in response to determining timing deficiencies.

8. A method comprising:
   selecting, by a computer, a path;
   determining, by the computer, if the path has a timing deficiency;
   segmenting, by the computer, the path into path segments;
   allocating, by the computer, the timing deficiency based on attributes of the segments; and modifying, by the computer, at least one device in a path if a signal arrives early such that the path has a lower power consumption with the at least one modified device.

9. A system comprising:
- a path selection module to select a path to perform a timing analysis;
- a path timing analysis module to determine if timing of the selected path does not meet a predetermined timing criteria;
- a path segmentor to segment the selected path and to determine a segmented path length; and
- a segmented path retiming module to allocate new timing specifications to the segmented path in response to the length of the segmented path and the determination that the selected path does not meet the predetermined timing criteria, wherein the new timing specifications are based upon a percentage of segmented path length to a total path length.

10. The system of claim 9, further comprising, a lock down module to lock down at least a portion of the path such that the segmented path retiming module refrains from allocating the new timing specification to the at least locked down portion of the path.

11. The system of claim 9, further comprising an input/output module to accept user input in the user input to edit the allocating of the new timing specification.

12. The system of claim 9, further comprising a path segment assembler to assemble paths that are parsed into function blocks, where the function blocks are processable by separate processing resources.

13. A system comprising:
- a path selection module to select a path to perform a timing analysis;
- a path timing analysis module to determine if timing of the selected path does not meet a predetermined timing criteria;
- a path segmentor to segment the selected path and to determine a segmented path length;
- a segmented path retiming module to allocate new timing specifications to the segmented path in response to the length of the segmented path and the determination that the selected path does not meet the predetermined timing criteria; and
- a macro assembler to interrelate connections and timing considerations of macros, wherein the macro assembler returns modified timing data to a macro based on a segment being assigned to the macro.

14. A tangible, machine-accessible, storage medium containing instructions which, when the instructions are executed by a machine, cause said machine to perform operations, comprising:
- selecting a path;
- determining if the path has a timing deficiency;
- segmenting the path into path segments; and
- allocating the timing deficiency across the segments according to the lengths of the segments, wherein the attributes comprise a percentage of path segment length to a total path length.

15. The tangible, machine-accessible, storage medium of claim 14, that when executed causes the computer to allocate the timing deficiency to unfrozen path segments.

16. The tangible, machine-accessible, storage medium of claim 14, that when executed causes the computer to separate the timing deficiency allocation based on a received input file and returning the deficiency allocation to a macro based on the received input file.

17. The tangible, machine-accessible, storage medium of claim 14, that when executed causes the computer to allocate the timing deficiency in response to user input.

* * * * *